United States Patent
Touchberry et al.

(10) Patent No.: US 8,071,019 B2
(45) Date of Patent: Dec. 6, 2011

(54) METHODS FOR INTRODUCTION OF A REACTIVE MATERIAL INTO A VACUUM CHAMBER

(75) Inventors: Alan Bruce Touchberry, Saint Louis Park, MN (US); Terry Dean Stark, Saint Louis Park, MN (US)

(73) Assignee: Honeywell International Inc., Morristown, NJ (US)

( * ) Notice: Subject to any disclaimer, the term of this patent is extended or adjusted under 35 U.S.C. 154(b) by 671 days.

(21) Appl. No.: 12/263,186

(22) Filed: Oct. 31, 2008

(65) Prior Publication Data

US 2010/0111750 A1    May 6, 2010

(51) Int. Cl.
C22C 24/00 (2006.01)
H01L 21/677 (2006.01)
(52) U.S. Cl. ........................................ 420/400; 414/217
(58) Field of Classification Search ............... 414/217; 420/400
See application file for complete search history.

(56) References Cited

U.S. PATENT DOCUMENTS

| | | | |
|---|---|---|---|
| 3,397,310 A | 8/1968 | Holloway et al. | |
| 4,817,112 A | 3/1989 | Weber et al. | |
| 5,528,028 A | 6/1996 | Chu et al. | |
| 6,495,822 B2 | 12/2002 | Hirano et al. | |
| 7,215,213 B2 | 5/2007 | Mescher et al. | |
| 7,229,669 B2 | 6/2007 | Youngner et al. | |
| 2004/0084395 A1 | 5/2004 | Youngner et al. | |
| 2005/0007118 A1 | 1/2005 | Kitching et al. | |
| 2006/0083789 A1* | 4/2006 | Ohtake et al. ................. | 424/600 |
| 2006/0257296 A1 | 11/2006 | Lipp | |

* cited by examiner

*Primary Examiner* — Jessica L Ward
*Assistant Examiner* — Alexander Polyansky
(74) *Attorney, Agent, or Firm* — Fogg & Powers LLC

(57) ABSTRACT

Methods for the introduction of a reactive material into a vacuum chamber while minimizing or eliminating the simultaneous introduction of contaminating materials or substances. As a result, contaminating materials and substances that can interfere with any measurements or other processes that occur in the vacuum chamber are minimized or eliminated.

20 Claims, 2 Drawing Sheets

METHODS FOR INTRODUCTION OF A REACTIVE MATERIAL INTO A VACUUM CHAMBER

BACKGROUND OF THE INVENTION

Reactive materials, including alkali metals such as rubidium and cesium, have many applications in industry. For example, one type of atomic clock utilizes a vapor cell containing an active medium of rubidium or cesium vapor that is simultaneously irradiated with light from a microwave signal and an optical source such as a laser. The optical source pumps the rubidium or cesium atoms from a ground state to a higher state from which they fall to an energy state which is at a hyperfine frequency different from the initial ground state. This causes the rubidium or cesium atoms to absorb energy at a microwave frequency corresponding to transitions between the two hyperfine levels of the ground state. It is desirable to have the longest amount of time possible to measure the energy levels of such atoms. One way to obtain a long measurement time is to keep the atoms in one place while measuring them. The vapor cell does this by containing the rubidium or cesium atoms in the vapor cell. Generally, such vapor cell structures provide a vacuum environment, such as a vacuum chamber, so that the behavior of the relatively small number of the rubidium or cesium atoms in the vapor cell can be measured with minimal interference from other materials.

In order to manufacture atomic clocks that are small, portable and highly accurate and have low power requirements, it is necessary to decrease the size of the various components of the atomic clock, including the vacuum chamber. However, as the size of the vacuum chamber is decreased, the problem of contamination that interferes with the measurement of the behavior of the relatively small number of rubidium or cesium atoms in the vacuum chamber increases.

SUMMARY OF THE INVENTION

Methods for the introduction of a reactive material into a vacuum chamber while minimizing or eliminating the simultaneous introduction of contaminating materials or substances are disclosed. As a result, contaminating materials and substances that can interfere with any measurements or other processes that occur in the vacuum chamber are minimized or eliminated.

In one embodiment of the present invention, a method of introducing a reactive material into a vacuum chamber comprises: providing a vacuum chamber assembly that comprises a vacuum chamber, an inlet fill tube fixedly attached to the vacuum chamber and an outlet fill tube fixedly attached to the vacuum chamber; placing a sealed container that contains a reactive material within the inlet fill tube; sealing the inlet fill tube to enclose the sealed container and obtain a vacuum tight seal; evacuating the vacuum chamber assembly through the outlet fill tube to generate a vacuum; sealing the outlet fill to using a vacuum tight seal to maintain the vacuum; breaking the sealed container that contains the reactive material to release the reactive material; optionally heating the reactive material in the inlet fill tube to facilitate migration of the reactive material into the vacuum chamber; and cutting and sealing the inlet fill tube between the vacuum chamber and the broken sealed container using a vacuum tight seal.

In certain embodiments, the reactive material is rubidium, the sealed container is glass and the rubidium in the inlet fill tube is heated to facilitate migration of the rubidium into the vacuum chamber. In other embodiments, the vacuum chamber is constructed from optical glass. In additional embodiments, the inlet and outlet fill tubes are frit sealed to the vacuum chamber.

As will be appreciated from the present application, the methodology of the present invention is particularly useful for the introduction of rubidium or cesium into the vacuum chamber of an atomic clock while minimizing or eliminating the introduction of fragments of a broken sealed container that held the rubidium or cesium before being broken. As a result, the introduction of fragments of the broken sealed container that could otherwise interfere with the measurement of the behavior of the relatively small number of the rubidium or cesium atoms in the vacuum chamber is minimized or eliminated.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENTS

An embodiment of the methods of the present invention for introducing a reactive material into a vacuum chamber will now be described. In describing this methodology, reference will be made to FIG. 1, which shows a block diagram illustrating an exemplary method for introducing a reactive material into a vacuum chamber, and FIG. 2, which shows a schematic view of an exemplary system for introducing a reactive material into a vacuum chamber.

Figure 1:
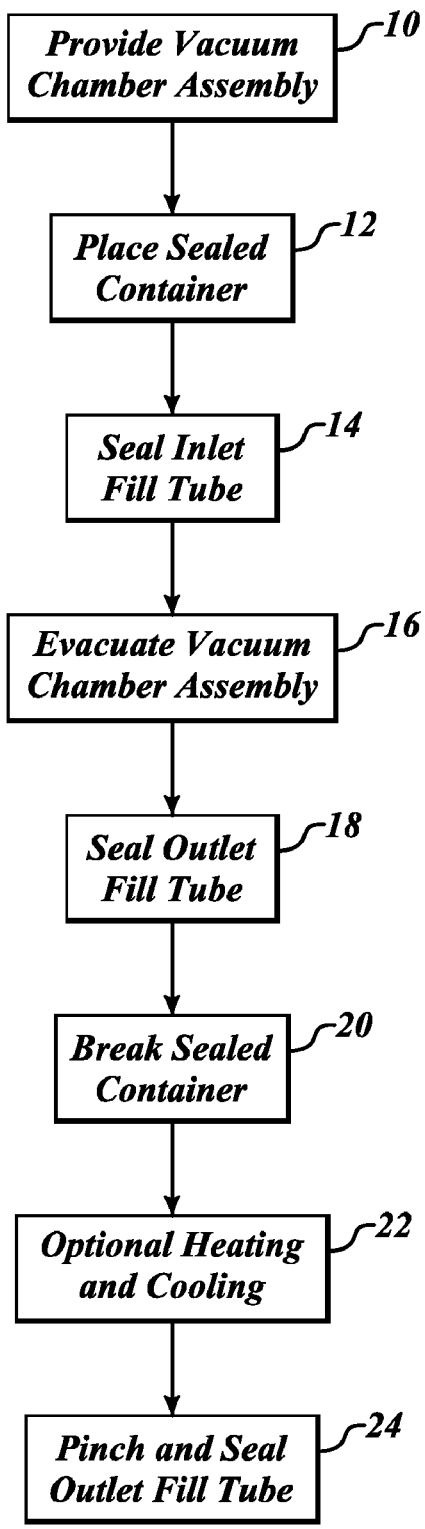
FIG. 1 is a block diagram illustrating an exemplary method for introducing a reactive material into a vacuum chamber, in accordance with an embodiment of the present invention.
Figure 2:
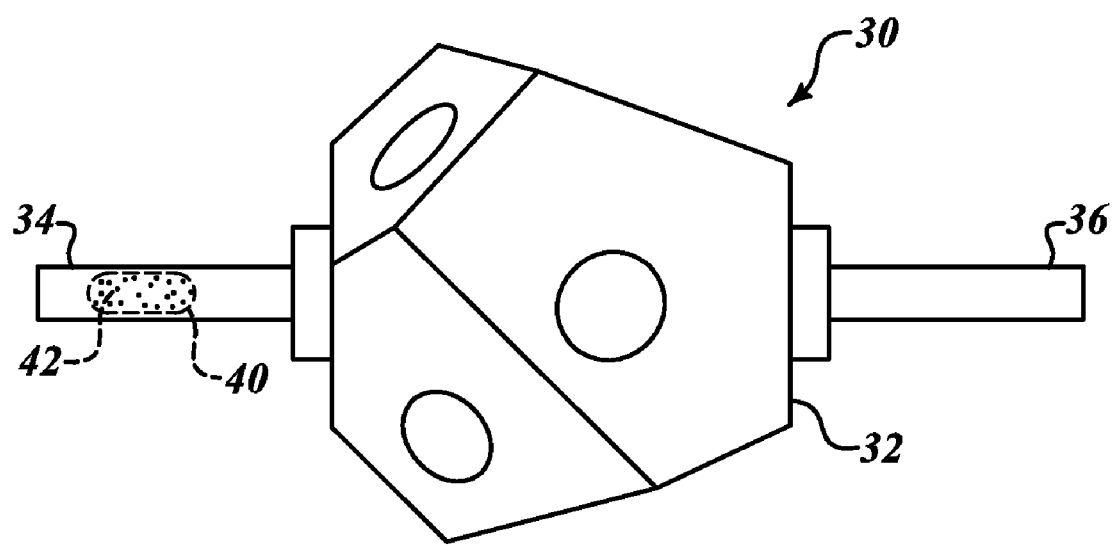
FIG. 2 is a schematic view of an exemplary system for introducing a reactive material into a vacuum chamber, in accordance with an embodiment of the present invention.

Block 10 of FIG. 1 represents the provision of a vacuum chamber assembly. Referring now to FIG. 2, a vacuum chamber assembly 30 includes a vacuum chamber 32, an inlet fill tube 34 fixedly attached to the vacuum chamber 30 and an outlet fill tube 36 fixedly attached to the vacuum chamber 30.

Various materials can be used to construct the components of the vacuum chamber assembly 30. Suitable materials for construction of the vacuum chamber 32 include, for example, optical glass, such as BK-7, vacuum-tight ceramics materials, ultra-low expansion glass such as ZERODUR or CERVIT, or metals. In general, the material used to construct the vacuum chamber should have the following properties: be vacuum tight, non-permeable to hydrogen or helium and non-reactive with the material to be injected (eg., rubidium). Suitable materials for the inlet fill tube 34 and the outlet fill tube 36 include, for example, nickel, iron, aluminum and nickel-iron alloys such as INVAR. In one embodiment, the inlet fill tube 34 and the outlet fill tube 36 are fixedly attached to the vacuum chamber 32 using various well-known techniques such as frit sealing or using a swage-lock or O-ring. The dimensions of the components of the vacuum chamber assembly 30 will vary depending on the desired application. For example, in the case of atomic clocks, the volume of the vacuum chamber 32 can range from about 0.5 $cm^3$ to about 5 $cm^3$, while the sizes of the inlet fill tube 34 and the outlet fill tube 36 can range from a diameter of about 1 mm to about 5 mm.

It should be understood that the vacuum chamber assembly 30 will also include other components depending on the particular application. For example, in the case of atomic clocks, the vacuum chamber assembly 30 can include mirrors and optical and fluorescent paths within the vacuum chamber 32 and photodiodes mounted on the exterior of the vacuum chamber 32. In addition, following their use in the methods of the present invention, the inlet fill tube 34 and the outlet fill tube 36 can be used as electrodes. All such variations are included within the scope of and contemplated by the present invention.

As represented by Block 12 of FIG. 1, following provision of the vacuum chamber assembly, a sealed container that contains a reactive material is placed in the inlet fill tube and pushed a measurable and verifiable distance into the fill tube so that the end of the inlet fill tube can be sealed without breaking the sealed container. Referring now to FIG. 2, a sealed container 40 that contains a reactive material 42 is placed in the inlet fill tube 34 of the vacuum chamber assembly 30. The sealed container 40 can be constructed of any material that is capable of containing the reactive material 42 without reacting in any significant way with the reactive material 42. It is also necessary that the sealed container 40 be constructed from a material that is capable of being broken while in the inlet fill tube 34, as described below. In one embodiment, the sealed container 40 is an ampule—a small glass capillary sealed at each end. A suitable material for the sealed container 40 includes, for example, glass. In general, the material used for the sealed container 40 will vary depending on the reactive material 42. For example, in the case of atomic clocks, the reactive material 42 can be rubidium or cesium, and the material used for the sealed container 40 is typically glass. Reactive materials that can be used in accordance with the methods of the present invention will vary depending on the desired application and include, for example, rubidium, cesium and barium. With respect to size, the sealed container 40 must be large enough to hold the desired amount of reactive material 42 but small enough to fit within the inlet fill tube 34.

As represented by Block 14 of FIG. 1, following placement of the sealed container, the inlet fill tube is sealed using a vacuum tight seal similar to that in ring laser gyro (RLG) construction. Referring now to FIG. 2, after the sealed container 40 of reactive material 42 is inserted into the inlet fill tube 34, the open end of the inlet fill tube 34 opposite the vacuum chamber 32 is sealed to enclose the sealed container 40 (without breaking it) and obtain a vacuum tight seal. This can be accomplished using various well known techniques, including, for example pinching and welding. If desired, the vacuum chamber assembly 30 can be tilted so that gravity causes the sealed container 40 to rest against the sealed end of the fill tube 34. Also, if desired, various processing and baking steps can be performed to clean the vacuum chamber 32 prior to evacuation, provided that the sealed container 40 remains intact during any such processing and baking steps.

As represented by Block 16 of FIG. 1, following the sealing of the inlet fill tube, the vacuum chamber assembly is evacuated. Referring now to FIG. 2, in the depicted embodiment, this can be accomplished by connecting the open end of the outlet fill tube 36 opposite the vacuum chamber 32 to standard vacuum generating equipment (e.g., pumps, valves, hoses, gauges, and the like; not shown) and pumping the vacuum chamber assembly 30 to the desired vacuum level. Depending on the application, a vacuum strength ranging from about $10^{-11}$ torr to about $10^{-8}$ torr (for example, about $10^{-10}$ torr) is acceptable.

As represented by Block 18 of FIG. 1, following evacuation of the vacuum chamber assembly, the outlet fill tube is sealed. Referring now to FIG. 2, the open end of the outlet fill tube 36 opposite the vacuum chamber 32 is sealed to obtain a vacuum tight seal and thereby maintain the vacuum created in the previous step. This can be accomplished as described above for the inlet fill tube 34.

As represented by Block 20 of FIG. 1, following the sealing of the outlet fill tube with a vacuum tight seal, the sealed container is broken. Referring now to FIG. 2, the sealed container 40 is broken to release the reactive material 42. This can be accomplished using various well known techniques, including, for example mechanical techniques such as squeezing, bending, shaking and the like. The released reactive material 42 then migrates by diffusion from the inlet fill tube 34 into the vacuum chamber 32. If desired or necessary for the particular reactive material 42, the inlet fill tube 34 is heated in order to facilitate migration of the reactive material 42 into the vacuum chamber 32 and the vacuum chamber 32 can be cooled in order to facilitate deposition of the reactive material 42 in the vacuum chamber 32 (FIG. 1, Block 22). The appropriate heating and cooling temperatures will vary depending on the nature of the reactive material 42. For example, in the case of atomic clocks in which the reactive material 42 is rubidium, the inlet fill tube 34 can be heated to a temperature ranging from about 80° C. to about 120° C. (for example, about 100° C.), while the vacuum chamber 32 can be cooled to room temperature (eg., about 20° C.) or below. Appropriate types of heating sources suitable for heating the reactive material 42 released into the inlet fill tube 34 include, for example, induction heaters, electric heaters and open flames. Appropriate types of cooling devices suitable for cooling the reactive material 42 that migrates into the vacuum chamber 32 include, for example, thermoelectric cooling devices, liquid nitrogen baths and air cooling.

As represented by Block 24 of FIG. 1, after migration of the reactive material from the inlet fill tube into the vacuum chamber, the inlet fill tube is pinched off and sealed. Referring now to FIG. 2, the inlet fill tube 34 is pinched off and sealed between the vacuum chamber 32 and the broken sealed container 40. This can be accomplished as described above for the inlet fill tube 34 and the outlet fill tube 36. This serves to remove the outer portion of the inlet fill tube 34 and the broken sealed container 40 from the vacuum chamber assembly. This also results in the creation of a vacuum tight seal and maintenance of the vacuum in the vacuum chamber assembly 30.

The foregoing methodology results in a vacuum chamber assembly 30 in which fragments of the broken sealed container 40 have been removed from the system and are therefore incapable of contaminating the vacuum chamber 32 and interfering with any measurements or other processes that occur in the vacuum chamber 32. For example, in the case of atomic clocks utilizing rubidium or cesium, contamination from fragments of the broken sealed container 40 that could interfere with the measurement of the behavior of the relatively small number of the rubidium or cesium atoms in the vacuum chamber 32 have been removed.

In addition to atomic clocks, the vacuum chamber assembly 30 resulting from the foregoing methodology can be used for other applications in which a vacuum chamber 32 containing minimal contaminating materials or substances is necessary or desirable, such as ring laser gyroscopes.

While the preferred embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of introducing a reactive material into a vacuum chamber comprising:
   providing a vacuum chamber assembly that comprises a vacuum chamber, an inlet fill tube fixedly attached to the vacuum chamber and an outlet fill tube fixedly attached to the vacuum chamber;
   placing a sealed container that contains a reactive material within the inlet fill tube;
   sealing the inlet fill tube to enclose the sealed container and obtain a vacuum tight seal;
   evacuating the vacuum chamber assembly through the outlet fill tube to generate a vacuum;
   sealing the outlet fill tube to maintain the vacuum;
   breaking the sealed container that contains the reactive material to release the reactive material;
   optionally heating the reactive material in the inlet fill tube to facilitate migration of the reactive material into the vacuum chamber; and
   cutting and sealing the inlet fill tube between the vacuum chamber and the broken sealed container to obtain a vacuum tight seal.

2. The method of claim 1, wherein the vacuum chamber is constructed of a material selected from the group consisting of optical glass, ceramic materials and ultra-low expansion glass.

3. The method of claim 2, wherein the vacuum chamber is constructed of optical glass.

4. The method of claim 1, wherein the vacuum chamber has a volume of about 0.5 cm$^3$ to about 5 cm$^3$.

5. The method of claim 1, wherein the inlet fill tube and the outlet fill tube have diameters of about 1 mm to about 5 mm.

6. The method of claim 1, wherein the inlet fill tube and the outlet fill tube are constructed of a material selected from the group consisting of nickel, iron, aluminum and alloys thereof.

7. The method of claim 1, wherein the inlet fill tube and the outlet fill tube are constructed of a nickel-iron alloy.

8. The method of claim 1, wherein the inlet fill tube and the outlet fill tube are frit sealed to the vacuum chamber.

9. The method of claim 1, wherein the sealed container is constructed of glass.

10. The method of claim 1, wherein the reactive material is selected from the group consisting of rubidium, cesium and barium.

11. The method of claim 1, wherein the reactive material is rubidium.

12. The method of claim 1, wherein the sealed container is broken by squeezing the inlet fill tube.

13. The method of claim 1, wherein the vacuum tight seals are produced by pinching the inlet fill tube and the outlet fill tube.

14. The method of claim 1, wherein the vacuum chamber assembly is evacuated using a vacuum pump connected to the outlet fill tube.

15. The method of claim 1, where the vacuum strength is about $10^{-11}$ torr to about $10^{-8}$ torr.

16. The method of claim 1, where the vacuum strength is about $10^{-10}$ torr.

17. The method of claim 1, wherein the reactive material is rubidium and the heating temperature is about 80° C. to about 120° C.

18. The method of claim 1, wherein the reactive material is rubidium and the heating temperature is about 100° C.

19. The method of claim 1, further comprising cooling the vacuum chamber to facilitate deposition of the reactive material in the vacuum chamber.

20. The method of claim 19, wherein the reactive material is rubidium and the cooling temperature is about 20° C.

* * * * *